United States Patent
Delrot et al.

(10) Patent No.: US 11,993,017 B2
(45) Date of Patent: May 28, 2024

(54) METHODS AND APPARATUS FOR TOMOGRAPHIC ADDITIVE MANUFACTURING WITH A SPATIALLY COHERENT LIGHT SOURCE

(71) Applicant: Ecole Polytechnique Federale de Lausanne (EPFL), Lausanne (CH)

(72) Inventors: Paul Delrot, Morges (CH); Damien Loterie, Ecublens (CH); Christophe Moser, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 161 days.

(21) Appl. No.: 17/291,115

(22) PCT Filed: Nov. 5, 2019

(86) PCT No.: PCT/EP2019/080155
§ 371 (c)(1),
(2) Date: May 4, 2021

(87) PCT Pub. No.: WO2020/094595
PCT Pub. Date: May 14, 2020

(65) Prior Publication Data
US 2021/0379829 A1     Dec. 9, 2021

(30) Foreign Application Priority Data
Nov. 6, 2018  (WO) ................. PCT/IB2018/058714

(51) Int. Cl.
*B29C 64/268*    (2017.01)
*B29C 64/135*    (2017.01)
(Continued)

(52) U.S. Cl.
CPC .......... *B29C 64/268* (2017.08); *B29C 64/135* (2017.08); *B29C 64/282* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 7,015,488 | B2 | 3/2006 | Ishikawa et al. |
| 2004/0223227 | A1 | 11/2004 | Ohmori et al. |

(Continued)

FOREIGN PATENT DOCUMENTS

| WO | WO-2014139815 A1 * | 9/2014 | ......... G03F 7/70033 |
|---|---|---|---|
| WO | 2018/208378 A2 | 11/2018 | |
| WO | 2019/043529 A1 | 3/2019 | |

OTHER PUBLICATIONS

B. Kelly et al., "Computer Axial Lithography (CAL): Toward Single Step 3D Printing of Arbitrary Geometries", May 16, 2017 (https://arxiv.org/pdf/1705.05893.pdf) See Spc., p. 1.

(Continued)

*Primary Examiner* — Jacob T Minskey
*Assistant Examiner* — Adrien J Bernard
(74) *Attorney, Agent, or Firm* — Finch & Maloney PLLC

(57) ABSTRACT

A method of fabricating a three-dimensional article comprises providing a spatially coherent light source (101, 201), generating from the light source (101, 201), patterns of light based on computed tomographic projections of the three-dimensional article, and projecting the patterns of light into a photoresponsive medium. The projecting is configured to define a three-dimensional dose distribution, thereby locally altering the phase of the photoresponsive medium and creating the article.

8 Claims, 2 Drawing Sheets

(51) Int. Cl.
  *B29C 64/282* (2017.01)
  *B33Y 10/00* (2015.01)
  *B33Y 30/00* (2015.01)

(56) References Cited

U.S. PATENT DOCUMENTS

| | | |
|---|---|---|
| 2009/0250828 A1 | 10/2009 | Rosen et al. |
| 2013/0056910 A1* | 3/2013 | Houbertz-Krauss ... B33Y 30/00 264/401 |
| 2018/0015672 A1 | 1/2018 | Shusteff et al. |
| 2020/0086388 A1* | 3/2020 | Zediker ............... B23K 26/032 |
| 2020/0180214 A1* | 6/2020 | Provin ................. B33Y 70/00 |

OTHER PUBLICATIONS

I. Bhattacharya et al., "Computed Axial Lithography: Volumetric 3D Printing of Arbitrary Geometries", Proc. SPIE 10656, Image Sensign Technologes: Materials, Devices, Systems, and Applications V, 10656OP See Spc., p. 1.

Europe North Ceramoptec: "Optran Ncc Uv/Wf", Mar. 25, 2011 See International Search.

International Search Report Corresponding to PCT/EP2019/080155 dated Apr. 2, 2020.

Written Opinion Corresponding to PCT/EP2019/080155 dated Apr. 2, 2020.

* cited by examiner

METHODS AND APPARATUS FOR TOMOGRAPHIC ADDITIVE MANUFACTURING WITH A SPATIALLY COHERENT LIGHT SOURCE

FIELD OF THE INVENTION

The present invention relates to methods and apparatus for the additive manufacturing of three-dimensional objects by tomographic back-projections.

BACKGROUND

For a long time, additive manufacturing has relied mainly on layer-by-layer 3D printing systems. In these systems, three-dimensional objects are fabricated by slicing their digital model into layers, and physically reproducing each layer successively onto a substrate. Recently however, a technology has emerged where objects are created volumetrically as opposed to layer-by-layer (*"Computed Axial Lithography (CAL): Toward Single Step 3D Printing of Arbitrary Geometries"*, Brett Kelly, Indrasen Bhattacharya, Maxim Shusteff, Robert M. Panas, Hayden K. Taylor, Christopher M. Spadaccini, https://arxiv.org/abs/170505893; *"Computed axial lithography: volumetric 3D printing of arbitrary geometries"*, Indrasen Bhattacharya; Brett Kelly; Maxim Shusteff; Christopher Spadaccini; Hayden Taylor, Proc. SPIE 10656, Image Sensing Technologies: Materials, Devices, Systems, and Applications V, 1O656OP; *"Methods and Apparatus for Three-Dimensional Fabrication by Tomographic Back Projections"*, Damien Loterie, Paul Delrot, Christophe Moser, WO 2019/043529 A1). This method is based on tomographic projections, similar to those used in medical imaging. In this method, a set of illuminations patterns are computed based on the 3D model of the object. A build volume containing a photosensitive material is then illuminated from many angles with these computed patterns of light, which leads to the solidification of well-defined parts of the photosensitive material into the final object. This tomographic method has advantages in terms of speed and the range of printable materials.

One challenge in tomographic additive manufacturing is to contain the solidification of the photosensitive material to only those areas that actually need to be solidified.

Indeed, since the light beam in this method has to traverse the entire build volume, it is possible that unwanted parts of the build volume accidentally become solidified during the fabrication process. This is detrimental to the accuracy and the resolution of the printed part.

SUMMARY OF THE INVENTION

In tomographic 3D printing, the spatial coherence of the light source is critical to obtaining accurate and high-resolution printed objects. Herein is disclosed a method and apparatus to carry out tomographic 3D printing with a spatially coherent light source for optimal print accuracy and resolution.

In a first aspect, the invention provides a method of fabricating a three-dimensional article comprising: providing a spatially coherent light source, generating from said light source patterns of light based on computed tomographic projections of said three-dimensional article, and projecting said patterns of light into a photoresponsive medium, whereby the projecting is configured to define a three-dimensional dose distribution, thereby locally altering the phase of the photoresponsive medium and creating the article.

In a second aspect, the invention provides a system for the fabrication of a three-dimensional article by computed tomographic projections, comprising a spatially coherent light source.

In a preferred embodiment, a beam-parameter product of the light source is less than 400 μm·rad or its étendue is lower than 0.16 mm$^2$.

In a further preferred embodiment, the spatially coherent light source is any of:
one laser;
multiple lasers;
one or multiple lasers coupled into an optical fiber.

In a further preferred embodiment, an optical fiber provides a means to physically separate the location of said one or multiple lasers coupled into the proximal end of the optical fiber from the location of the distal end of the optical fiber out of which light exits. This is beneficial to delocalize the electrical equipment and heat generated by the one or multiple lasers from the location of the photoresponsive medium into which light is sent to create the 3D object. The fiber provides flexibility to physically arrange the distal end appropriately to fit the system comprising the projector projecting said patterns of light and photoresponsive medium into a spatially confined space.

In a further preferred embodiment, an optical fiber section of the optical fiber is of rectangular shape and configured to match a rectangular shape of spatial light modulators.

In a further preferred embodiment, the spatially coherent light source has a beam-parameter product less than 37 μm·rad.

In a further preferred embodiment, the optical fiber section is a square core of 200 μm by 200 μm and a numerical aperture of 0.20 NA, yielding a fiber source with beam-parameter product of 20 μm·rad.

In a further preferred embodiment, the partially coherent light source has a beam intensity that varies less than 50% over the area of the beam.

BRIEF DESCRIPTION OF THE DRAWINGS

The invention will be better understood through the detailed description of preferred embodiments and in reference to the drawings, wherein.

DETAILED DESCRIPTION OF PREFERRED EMBODIMENTS

In tomographic 3D printing, a volume of photoresponsive materials is illuminated from many directions with patterns of light. These patterns of light are computed with an algorithm similar to that used in X-ray computed tomography ("CT scanners"). The cumulative effect of illuminating the photoresponsive material with each of these light patterns from each corresponding direction is to deposit a controlled three-dimensional distribution of light dose into the photoresponsive medium. This distribution of light dose leads to a distribution of alterations in the photoresponsive medium, which creates the three-dimensional object. For example, for a photoresponsive material that solidifies under exposure to light, the three-dimensional distribution of light dose causes the material to solidify in the desired three-dimensional object.

The method of volumetric additive manufacturing by tomographic back-projections and of using the same for the fabrication of three-dimensional objects by tomographic back-projections is known and described in detail in WO 2018/208 378 A2 and WO 2019/043 529 A1.

Preferably, the photoresponsive medium to be treated is provided in an optically transparent vessel which defines a build region.

In order to obtain well-defined spatial dose distributions with this method, it is important to illuminate the photoresponsive material with light that has well-defined spatial properties. Indeed, tomographic algorithms such as the Radon transform or the fan-beam transform have specific underlying assumptions on the type of light source used in the tomographic process. For example, the Radon transform assumes parallel light beams. The fan-beam transform assumes a light beam that perfectly converges into one point.

In practice, it is impossible to fulfil these conditions perfectly, due to the diffraction limit. Realistic light sources have non-zero étendue (i.e. limited spatial coherence), which in turn limits the distance over which light patterns can accurately be displayed.

Figure 1:
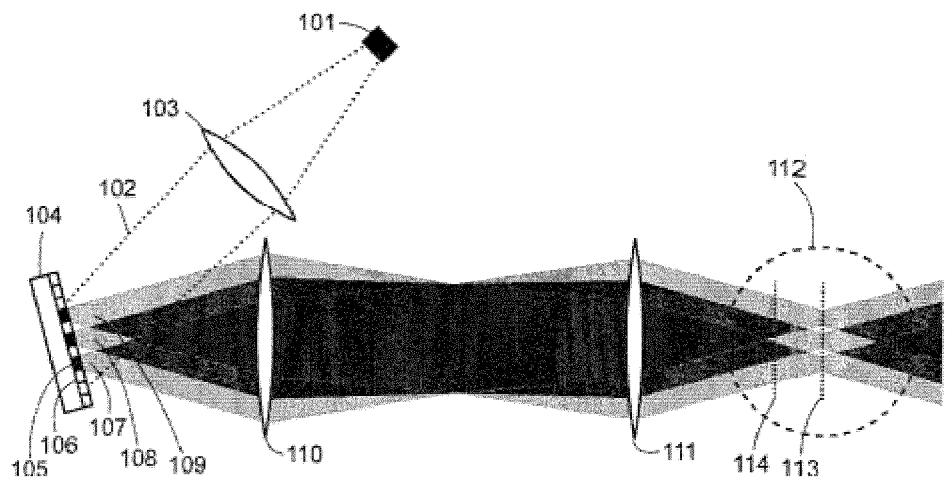
FIG. 1 is a schematic illustration of tomographic 3D printing with a high étendue light source.

This is schematically illustrated in FIG. 1 for one possible embodiment of tomographic additive manufacturing. A high-étendue light source 101 (for example an LED or a lamp) projects a beam of light 102 via a collection lens 103 onto a light modulator 104 (for example a digital micro mirror device), which imprints a light pattern onto the beam of light (i.e. one of the computed patterns for tomographic additive manufacturing). In FIG. 1, pixels that are 'on' are represented with a dark shading (105) while pixels that are 'off' are represented with a light shading (106). In this illustration, three pixels are 'on', causing three small sub-beams of light (107, 108 and 109) to be reflected from the modulator 104. These sub-beams have a high divergence, due to the high étendue of the source. Therefore, after being relayed by lenses 110 and 111 into the build volume 112 for tomographic additive manufacturing, the light pattern is sharp in the focal plane 113 of the build volume 112, but the sub-beams are smeared together in a plane 114 which is a certain distance away from the center of the build volume. In other words, a light source with a high étendue (low radiance) limits the achievable depth of field inside the build volume. This causes the actual three-dimensional dose distributions for object fabrication to deviate from the desired distribution, leading to artefacts in the constructed object.

Figure 2:
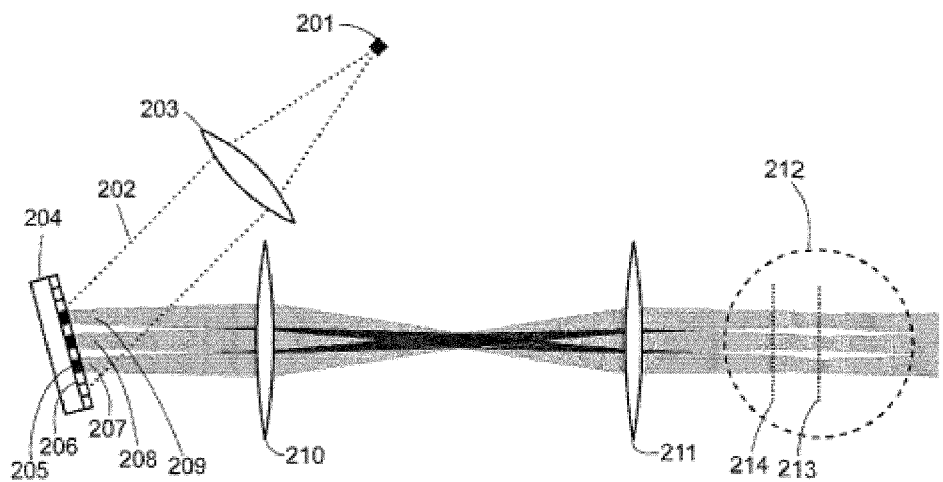
FIG. 2 is a schematic illustration of tomographic 3D printing with a low étendue light source.

In FIG. 2, the same situation is depicted with a low-étendue source. A low-étendue light source 201 (for example a laser) projects a beam of light 202 via a collection lens 203 onto a light modulator 204, which imprints a light pattern onto the beam of light. The pixels that are 'on' are represented with a dark shading (205) while pixels that are 'off' are represented with a light shading (206). In this illustration, three pixels are 'on', causing three small sub-beams of light (207, 208 and 209) to be reflected from the modulator 204. These sub-beams have a low divergence, due to the low étendue of the source. Therefore, after being relayed by lenses 210 and 211 into the build volume 212 for tomographic additive manufacturing, the light pattern is clearly defined in the focal plane 213 of the build volume 212, as well as in a plane 214 which is a certain distance away from the center of the build volume. In other words, a light source with a low étendue (high radiance) allows accurately projecting the computed light patterns through the entire depth of the build volume.

While FIG. 1 and FIG. 2 show a particular embodiment of tomographic additive manufacturing, it is to be understood that the principle of using a low étendue (high radiance) light source as described in the present disclosure can be applied to any other embodiment of tomographic additive manufacturing.

Figure 3:
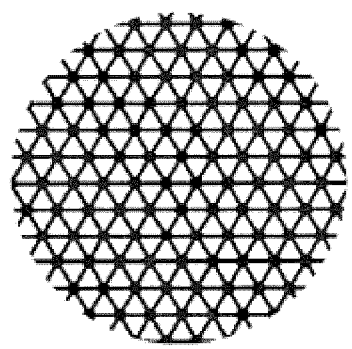
FIG. 3 is an illustration of a section of a printed object without artefacts.
Figure 4:
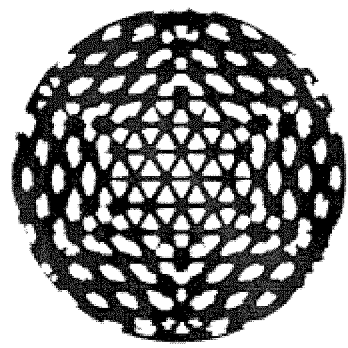
FIG. 4 is an illustration of a section of a printed object with artefacts.

In FIG. 3 and FIG. 4, an illustration is provided of the artefacts caused by tomographic printing with a high-étendue light source. FIG. 3 is an illustration of a section of an object created by tomographic 3D printing without artefacts due to divergent light sources. FIG. 4 illustrates the result after printing the same object tomographically with a divergent light source: while the object features are still well defined in the center of the object, artefacts appear towards the edge of the object.

According to the present invention, the beam parameter product is the product of a beam's (preferably a laser beam's) divergence angle (half-angle, i.e. its numerical aperture) and half of the width of the source (i.e. its radius if it is a source with a circular shape) at its narrowest point (the beam waist). The beam parameter product quantifies the quality of a laser beam, and how well it can be focused to a small spot. The beam parameter product is indicated in μm·rad.

According to the present invention, the étendue is a property of light in an optical system, which characterizes how "spread out" the light is in area and angle. It corresponds to the beam parameter product and is indicated in $mm^2$.

The requirements on the étendue of the light source depend on a number of parameters, such as the targeted print resolution, the refractive index of the photoresponsive material, and the amount of overlap between voxels that is tolerated at the edge of the build volume. The formula below describes the relationship between these parameters and the beam-parameter product of the source, which is the product of half of the width of the source (i.e. its radius if it is a source with a circular shape) multiplied by half of the angle of divergence of the source (i.e. its numerical aperture):

$$BPP = 0.5\ L_S\ NA_S = 0.5\ n\ p\ L_V$$

Here, BPP stands for the beam-parameter product, $L_S$ is the full width (or diameter) of the source, $NA_S$ is the numerical aperture of the source, n is the refractive index of the photoresponsive medium, p is the percentage of tolerated overlap between a voxel and its neighbor at the edge of the build volume (in other words, how much a sub-beam such as 208 in FIG. 2 is allowed to grow between the center 213 of the build region 212 and the outer edge of build region), and $L_V$ is the desired voxel resolution in the center of the build volume. Note that in the case where a light source is used to illuminate a light modulator, such as the situation described in FIG. 1 and FIG. 2, the required etendue or BPP of the light source is independent of the size of the build volume and only depends on the resolution parameters and the refractive index.

Indeed, if the build volume doubles in size and the targeted resolution stays constant, the divergence of the sub-beams in the light patterns needs to decrease in order to limit voxel expansion at the edge of the build volume, however at the same time the light source can be expanded over a larger amount of pixels, thus increasing the permitted illumination area. The area and divergence of the source therefore change in opposite proportions such that the BPP stays constant.

For the following numerical example, let us assume that we wish to limit the divergence of the sub-beams that make up the light patterns (for example sub-beam 208 in FIG. 2) such that the beams are at most 50% bigger at the edge of the build volume 212 compared to the center 213. Let us also assume a photoresponsive medium with a refractive index of 1.47. Then, if a 100 µm print resolution is desired in the center of the build volume, the beam-parameter product (i.e. the product of beam radius and beam divergence half-angle) of the light source should be below 37 µm·rad. In that case, if a source is used with a numerical aperture of 0.20, then the source should have a diameter of at most 370 µm. If a print resolution of 200 µm is acceptable, a source with a beam-parameter product of 74 µm·rad can be used instead. If a print resolution of 0.5 mm is acceptable, a source of 184 µm·rad can be used.

The light source for tomographic additive manufacturing is usually also required to have a high power (in order to minimize printing time). The combination of the requirements for a high power and a low étendue (or beam-parameter product) means that high-radiance light sources such as lasers allow the highest printing performance (in terms of speed and resolution).

In order to achieve the required high illumination power in a limited étendue budget as described above, one can also combine multiple laser sources into an optical fiber. According to the present invention, 2 to 50, preferably 10 to 40 and most preferably 20 to 30 laser devices are combined within the optical fiber. For example, 25 laser diodes with a beam-parameter product of 4 µm·rad can be combined into an optical fiber with a square core of 70 µm by 70 µm and a numerical aperture of 0.16 NA, yielding a fiber source with beam-parameter product of 5.6 µm·rad. The laser sources can be combined in free-space (for example with a so-called "knife-edge combiner") or using fiber optics (with a fiber combiner). For tomographic additive manufacturing, fiber-coupled sources have the additional advantage that they provide a uniform intensity profile. This is sometimes called a flat top or top hat intensity profile. The homogeneity of a fiber output allows to accurately display light patterns for tomographic additive manufacturing, without spurious intensity variations due to the source's beam profile. For example, with an optical fiber it is possible to illuminate a light modulator with a light beam that has less than 15% intensity variation over the aperture of the modulator. With a square core fiber, the shape of the illumination light can also precisely be matched with the active area of the light modulator, ensuring an optimal optical efficiency.

According to a preferred embodiment, an optical fiber provides a means to physically separate the location of said one or multiple lasers coupled into the proximal end of the optical fiber from the location of the distal end of the optical fiber out of which light exits. This is beneficial to delocalize the electrical equipment and heat generated by the one or multiple lasers from the location of the photoresponsive medium into which light is sent to create the 3D object. The fiber provides flexibility to physically arrange the distal end appropriately to fit the system comprising the projector projecting said patterns of light and photoresponsive medium into a spatially confined space.

The invention claimed is:

1. A method of fabricating a three-dimensional article with volumetric additive manufacturing by computed projections, sad method comprising:
    providing a spatially coherent light source, wherein a beam-parameter product of the light source is less than 400 µm*rad or its etendue is lower than 0.16 mm$_2$,
    generating from said light source, patterns of light based on computed projections of said three-dimensional article, and
    projecting said patterns of light into a photoresponsive medium, whereby the projecting is configured to define a three-dimensional dose distribution, thereby locally altering the phase of the photoresponsive medium and creating the article.

2. The method according to claim 1, wherein a beam emitted from said light source has an intensity that varies less than 50% over an area of the beam.

3. The method according to claim 1, wherein said patterns of light are generated by projecting a beam of light from said spatially coherent light source onto a light modulator.

4. The method according to claim 1, wherein said photoresponsive medium is provided in an optically transparent vessel which defines a build region.

5. The method according to claim 3, wherein projecting said patterns of light is carried out such that a print resolution in a center of a build volume in the range from 100 to 500 µm is obtained.

6. The method according to claim 5, wherein the photoresponsive medium having a refractive index in the range from 1.20 to 1.60 is used and the beam-parameter product of the light source is less than 200 µm*rad.

7. The method according to claim 1, wherein said spatially coherent light source comprises one or multiple lasers coupled into an optical fiber.

8. The method according to claim 7, wherein with said optical fiber a light modulator can be illuminated with a light beam that has less than 15% intensity variation over an aperture of the light modulator.

* * * * *